Patented Jan. 6, 1953

2,624,735

UNITED STATES PATENT OFFICE 2,624,735

4,4'-POLYMETHYLENE-BIPIPERIDINIUM DERIVATIVES

Moses Wolf Goldberg, Upper Montclair, and Lester Mischa Jampolsky, Clifton, N. J., assignors to Hoffmann-La Roche Inc., Nutley, N. J., a corporation of New Jersey No Drawing. Application February 1, 1951, Serial No. 208,981

7 Claims. (Cl. 260—293)

The present invention relates to 4,4'-polymethylenebis(1,1 - di - lower alkylpiperidinium salts) wherein the polymethylene chain contains at least four methylene groups. The new compounds are useful as curariform agents.

In general, the new compounds can be prepared by quaternizing 4,4'-polymethylenebis(1-lower alkylpiperidines), wherein the polymethylene chain contains at least four methylene groups, with a lower alkyl ester of a strong acid, for example, methyl chloride, methyl bromide, methyl iodide, dimethyl sulfate, methyl p-toluene sulfonate, ethyl bromide, propyl bromide, n-butyl iodide and the like.

The 4,4'-polymethylenebis(1-lower alkylpiperidines) can, in general, be prepared by the catalytic hydrogenation of 4,4'-polymethylenebis (1-lower alkylpyridinium halides), wherein the polymethylene chain contains at least four methylene groups. The 4,4'-polymethylenebis(1-lower alkylpyridinium halides) can be obtained by quaternizing 4,4'- polymethylene - bipyridines, wherein the polymethylene chain contains at least four methylene groups, with a lower alkyl halide.

The preparation of the 4,4'-polymethylene-bipyridines and the 4,4'-polymethylenebis(1-lower alkylpyridinium halides), wherein the polymethylene chain contains at least four methylene groups, is illustrated by the following examples:

EXAMPLE A

*4,4'-tetramethylene-bipyridine*

Seventy-two grams of 3-(4-pyridyl)-1-methoxy propane were refluxed with 700 cc. of 48% hydrobromic acid for four hours, and the reaction mixture was evaporated to dryness in vacuo at 100° C. The residue, 3-(4-pyridyl)-1-bromopropane hydrobromide, which consisted of a mass of hygroscopic needles, was directly converted into the unstable free base by dissolving it in ice water, adding solid potassium carbonate and extracting with ether. The ether solution was well dried, and an aliquot equivalent to 40 grams of 3-(4-pyridyl)-1-bromopropane was cooled to about −80° C. This was slowly added to a stirred liquid ammonia suspension of gamma-picoline potassium, prepared by the addition of 20 grams of gamma-picoline to 2 liters of liquid ammonia containing 12 grams of potassium amide. The reaction mixture was stirred for three hours at about −30° C. and then the ammonia was allowed to evaporate. The residue so obtained was dissolved in water and extracted well with ether. The crystalline product, 4,4'-tetramethylene-bipyridine, obtained on evaporation of the dry ether extract, was recrystallized four times from methanol and from acetone, whereupon the melting point remained constant at 111–115° C.

EXAMPLE B

*4,4'-tetramethylenebis(1-methylpyridinium bromide)*

To 1 liter of acetone containing 25.3 grams of 4,4'-tetramethylene-bipyridine were added 30 grams of methyl bromide in acetone. The precipitate which formed on allowing the reaction mixture to stand at room temperature for 18 hours was separated and crystallized from a methanol-acetone mixture. The hygroscopic crystals melted at 179° C.

EXAMPLE C

*4,4'-pentamethylene-bipyridine*

To about 2 liters of liquid ammonia, containing 26.3 grams of potassium amide, were added 47 grams of gamma-picoline and the mixture was stirred for ten minutes at about −80° C. Fifty-one grams of trimethylene bromide in 250 cc. of ether were slowly added to the stirred mixture. After stirring for a few hours, ammonium chloride was added and the ammonia was allowed to evaporate. The residue was taken up in water and extracted with ether. The dried ether was evaporated to dryness at 100° C. in vacuo. The crystalline residue so obtained was recrystallized four times from a benzene-petroleum ether mixture, whereupon the melting point was constant at 51–56° C.

EXAMPLE D

*4,4'-pentamethylenebis(1-methylpyridinium bromide)*

To 250 cc. of acetone containing 41.6 grams of 4,4'-pentamethylene-bipyridine were added 40 grams of methyl bromide in 200 cc. of acetone. The reaction mixture was allowed to stand in the dark at room temperature for 16 hours. The hygroscopic crystals which formed were then filtered off. They melted at 218–222° C. with decomposition.

EXAMPLE E

*4,4'-hexamethylene-bipyridine*

To 2.5 liters of liquid ammonia, containing 30 grams of potassium amide, were added 53 grams of gamma-picoline at about −80° C. and, after stirring for 15 minutes, 56 grams of tetramethylene dibromide were added. The stirring was continued for three hours at the same temperature, after which time the ammonia was allowed to evaporate. The residue was taken up in water and extracted with ether. The dried ether was evaporated, and the residue so obtained was distilled at 0.5 mm. The fraction boiling between 170–180° C. (0.5 mm.), 4,4'-hexamethylene-bipyridine, was converted immediately into the dimethobromide as in the following example.

EXAMPLE F

*4,4'-hexamethylenebis(1-methylpyridinium bromide)*

Sixty grams of 4,4'-hexamethylene-bipyridine was dissolved in 100 cc. of acetone and 150 grams of methyl bromide in 350 cc. of acetone were added. The crystals which formed on standing were filtered and recrystallized five times from methanol-acetone. They decomposed at 206–209° C.

EXAMPLE G

*4,4'-heptamethylene-bipyridine dihydrobromide*

To approximately 2 liters of liquid ammonia, containing 20.8 grams of potassium amide, were added 38 grams of gamma-picoline and the reaction mixture stirred for 15 minutes. Forty-eight grams of pentamethylene dibromide were carefully added at about −80° C. and the stirring continued for three hours at the same temperature. The ammonia was then allowed to evaporate, the residue taken up in water and extracted with ether. The dried ether solution was evaporated to dryness at 100° C. and 15 mm. The residue, 4,4'-heptamethylene-bipyridine, was converted to the dihydrobromide by means of 48% hydrobromic acid. After five crystallizations of this salt from ethanol, it melted at 209–211° C. with decomposition.

EXAMPLE H

*4,4'-octamethylene-bipyridine*

To about 2 liters of liquid ammonia containing 20.8 grams of potassium amide, were added at about −80° C., 38 grams of gamma-picoline while stirring. After stirring for ten minutes, 55 grams of hexamethylene dibromide in 400 cc. of ether were slowly added. The mixture was stirred for another hour and then the ammonia was allowed to evaporate. The residue thus formed was dissolved in water, the solution made strongly alkaline by the addition of 6 N sodium hydroxide and extracted well with ether. The combined ether extracts were dried and evaporated to dryness. The residue was distilled at 0.2 mm. The 4,4'-octamethylene-bipyridine distilled between 242–251° C.

The dihydrobromide of 4,4'-octamethylene-bypyridine was prepared by dissolving the free base in 40% hydrobromic acid and heating on the steam bath for five minutes. The crystals which formed on cooling were recrystallized four times from methanol. The purified material melted at 279–285° C. with decomposition.

EXAMPLE I

*4,4'-octamethylenebis(1-methylpyridinium bromide)*

Twenty-seven grams of 4,4'-octamethylene-bypyridine were dissolved in 200 cc. of acetone, and 30 grams of methyl bromide in 250 cc. of acetone were added. After standing at 5° C., the crystals which had formed were separated and recrystallized three times from methanol-acetone. The purified compound melted at 282–288° C. with decomposition.

The preparation of the 4,4'-polymethylenebis-(1-alkylpiperidines), wherein the polymethylene chain contains at least four methylene groups, is illustrated by the following examples:

EXAMPLE 1

*4,4'-tetramethylenebis(1-methylpiperidine)*

Forty-one grams of 4,4'-tetramethylenebis(1-methylpyridinium bromide) were hydrogenated in 200 cc. of methanol at room temperature and 1000 lbs./sq. inch pressure with 1 gram of platinum oxide catalyst. After two hours the catalyst was separated by filtration, the filtrate acidified with concentrated hydrochloric acid and evaporated to dryness at 100° C. and 15 mm. The residue was taken up in water, the solution made alkaline by the addition of 6 N sodium hydroxide and extracted with ether. The ether was dried and evaporated. The residue was crystallized twice from acetone, whereupon the compound melted at 61–63° C.

EXAMPLE 2

*4,4'-pentamethylenebis(1-methylpiperidine)*

Twenty-eight grams of 4,4'-pentamethylenebis(1-methylpyridinium bromide) were dissolved in methanol and hydrogenated at a pressure of 1000 lbs./sq. inch at room temperature in the presence of 2 grams of platinum oxide catalyst. After the hydrogen uptake had ceased, the reaction mixture was filtered, acidified and evaporated to dryness in vacuo. The residue was dissolved in water, the solution made strongly alkaline and extracted well with ether. The combined ether extracts were dried and evaporated. This residue was distilled and the fraction boiling between 112–180° C. (0.7 mm.) was dissolved in petroleum ether and passed through an alumina column to remove impurities. The purified oily material, which was obtained by the evaporation of the solution, was 4,4'-pentamethylenebis(1-methylpiperidine). Its dipicrate was prepared as follows:

To an ether solution of 0.37 gram of 4,4'-pentamethylenebis(1-methylpiperidine) was added a saturated ether solution of picric acid. The oily solid which formed on standing was separated and crystallized four times from acetone-ether. The crystalline dipicrate decomposed at 204–206° C.

EXAMPLE 3

*4,4'-pentamethylenebis(1-methylpiperidine) dihydrochloride*

20.4 grams of 4,4'-pentamethylenebis(1-methylpyridinium bromide) were dissolved in 240 cc. of methanol and hydrogenated at a pressure of 1000 lbs. per sq. inch and 25° C. for 30 minutes in the presence of 2 grams of platinum oxide catalyst. The filtered hydrogenation solution was acidified with 6 N hydrochloric acid, evaporated to dryness, the residue taken up in water, the solution made alkaline and extracted well with ether. The residue obtained by evaporation of the dried ether solution was distilled in vacuo. A portion of the material distilling at 123–126° C. (0.35 mm.) was dissolved in methanol and a solution of hydrochloric acid in ether added. The crystals which formed were recrystallized three times from methanol-ether. Melting point 239–242° C. with decomposition. The compound tends to retain water of crystallization.

EXAMPLE 4

*4,4'-hexamethylenebis(1-methylpiperidine)*

Fifty-nine grams of 4,4'-hexamethylenebis(1-methylpyridinium bromide) were hydrogenated in 200 cc. of methanol at room temperature and 1000 lbs./sq. inch pressure in the presence of 2 grams of platinum oxide catalyst. After one hour, the catalyst was separated by filtration, the filtrate acidified with concentrated hydrochloric acid and evaporated to dryness at 100° C. and 15 mm. pressure. The residue was taken up in water, the solution made alkaline by the addition of 6 N sodium hydroxide and extracted with ether. The ether solution was dried and evaporated. The crystalline residue was recrystallized from acetonitrile and from acetone. The purified material melted at 42° C.

EXAMPLE 5

*4,4'heptamethylenebis(1-methylpiperidine) dihydrochloride*

Twenty-seven grams of 4,4'-heptamethylenebipyridine were dissolved in 150 cc. of acetone and 23 grams of methyl bromide in 142 cc. of acetone were added. After standing 18 hours at room temperature, the 4,4'-heptamethylenebis(1 - methylpyridinium bromide), which had formed as a dark colored oil, was separated, dissolved in methanol and hydrogenated at room temperature and 1000 lbs./sq. inch pressure in the presence of 1.5 grams of platinum oxide catalyst.

The filtered hydrogenation solution was acidified with 6 N hydrochloric acid, evaporated to dryness, the residue taken up in water, the solution made strongly alkaline with 6 N sodium hydroxide and extracted well with ether. One gram of the 4,4'-heptamethylenebis(1-methylpiperidine) obtained by evaporation of the dried ether extract was dissolved in 15 cc. of alcohol and an excess of hydrochloric acid dissolved in ether was added. The solution was evaporated to dryness and the residue crystallized from aqueous acetone and from methanol-acetone. The dihydrochloride melted at 226–229° C. with decomposition. It tends to retain water of crystallization.

EXAMPLE 6

*4,4'-octamethylenebis(1-methylpiperidine)*

Forty-one grams of crude 4,4'-octamethylenebis(1-methylpyridinium bromide) were dissolved in 175 cc. of methanol and hydrogenated in the presence of 1 gram of platinum oxide catalyst at a pressure of 1000 lbs./sq. inch and room temperature. After the hydrogen uptake had ceased, the solution, containing some crystalline material, was warmed and filtered. The filtrate was acidified with hydrochloric acid and evaporated to dryness in vacuo. The residue so obtained was dissolved in water, the solution made strongly alkaline by addition of 6 N sodium hydroxide and then extracted well with ether. The crystalline residue obtained by evaporation of the dried ether extract was recrystallized from acetone and from acetonitrile whereupon it melted at 40–43° C.

The preparation of the 4,4'-polymethylenebis(1,1-di-lower alkylpiperidinium salts), wherein the polymethylene chain contains at least four methylene groups, is illustrated by the following examples:

EXAMPLE I

*4,4'-tetramethylenebis(1,1-dimethylpiperidinium bromide)*

To 6 grams of 4,4'-tetramethylenebis(1-methylpiperidine) in 70 cc. of acetone were added 9 grams of methyl bromide in 55 cc. of acetone. This mixture was allowed to stand at room temperature for 18 hours in the dark. The crystals which formed were collected and recrystallized twice from methanol-ether and twice from methanol. The compound melted at 321–325° C. with decomposition.

EXAMPLE II

*4,4'-pentamethylenebis(1,1-dimethylpiperidinium bromide)*

Five hundred mg. of 4,4'-pentamethylenebis(1-methylpiperidine) were dissolved in 5 cc. of acetone and 660 mg. of methyl bromide in 10 cc. of acetone were added. After standing for about 16 hours at room temperature the crystals which formed were filtered. After four recrystallizations from a mixture of methanol, acetone and ether, the compound melted at 278–281° C. with decomposition.

EXAMPLE III

*4,4'- hexamethylenebis(1,1-dimethylpiperidinium bromide)*

Four grams of 4,4'-hexamethylenebis(1-methylpiperidine) and 4 grams of methyl bromide were allowed to stand at room temperature in acetone for 16 hours. The crystals which formed were recrystallized three times from methanol. The compound melted at 311° C. with decomposition.

EXAMPLE IV

*4,4'-heptamethylenebis(1,1-dimethylpiperidinium bromide)*

To an acetone solution containing 8 grams of 4,4'-heptamethylenebis(1-methylpiperidine) were added 5.7 grams of methyl bromide in acetone. The crystals which formed on allowing the reaction mixture to stand at room temperature for 16 hours were filtered and recrystallized 6 times from acetone-methanol. The purified product melted at 291–301° C. with decomposition.

EXAMPLE V

*4,4'-octamethylenebis(1,1 - dimethylpiperidinium bromide)*

To 3.2 grams of 4,4'-octamethylenebis(1-methylpiperidine) in 200 cc. of acetone were added four grams of methyl bromide dissolved in acetone. The crystals which formed on allowing the mixture to stand at room temperature for 1½ hours were separated and recrystallized from methanol-acetone and from aqueous acetone. The product melted at 323–326° C. with decomposition.

EXAMPLE VI

*4,4'-tetramethylenebis(1-ethyl-1-methylpiperidinium iodide)*

A solution of 3 grams of ethyl iodide in 10 cc. of ethanol was added to 50 cc. of ethanol containing 1.9 grams of 4,4'-tetramethylenebis(1-methylpiperidine). The solution was refluxed for 1½ hours and then allowed to stand at 25° C. for 18 hours. The reaction mixture was evaporated to dryness in vacuo. The residue was crystallized from ethanol. The purified product melted at 303–304° C. with decomposition.

EXAMPLE VII

*4,4'-hexamethylenebis(1,1-dimethylpiperidinium p-toluenesulfonate)*

To 200 cc. of methanol containing 4.6 grams of 4,4'-hexamethylenebis(1-methylpiperidine) were added 6.5 grams of methyl-p-toluenesulfonate in 20 cc. of methanol. The solution was refluxed for 2 hours, allowed to stand at 25° C. for 18 hours and then concentrated to 50 cc. in vacuo. The crystals which formed were separated and recrystallized four times from methanol. The purified product melted at 224–227° C.

We claim:

1. 4,4'-polymethylenebis(1,1-di-lower alkylpiperidinium salts), wherein the polymethylene chain contains at least four methylene groups.
2. 4,4'-polymethylenebis(1,1-di-lower alkylpiperidinium halides), wherein the polymethylene chain contains at least four methylene groups.
3. 4,4'-tetramethylenebis(1,1-dimethylpiperidinium bromide).
4. 4,4'-pentamethylenebis(1,1-dimethylpiperidinium bromide).
5. 4,4'-hexamethylenebis(1,1-dimethylpiperidinium bromide).
6. 4,4'-heptamethylenebis(1,1-dimethylpiperidinium bromide).
7. 4,4'-octamethylenebis(1,1-dimethylpiperidinium bromide).

MOSES WOLF GOLDBERG.
LESTER MISCHA JAMPOLSKY.

REFERENCES CITED

The following references are of record in the file of this patent:

Thayer et al., J. Am. Chem. Soc., vol 70, pp. 2330–2333 (1948).